United States Patent
Yoon

(10) Patent No.: US 10,334,644 B2
(45) Date of Patent: Jun. 25, 2019

(54) APPARATUS AND METHOD FOR TRANSMITTING DEVICE TO DEVICE COMMUNICATION CHANNEL IN WIRELESS COMMUNICATION SYSTEM

(71) Applicants: SK TELECOM CO., LTD., Seoul (KR); INNOSKY, Seoul (KR)

(72) Inventor: Sung Jun Yoon, Seoul (KR)

(73) Assignees: SK TELECOM CO., LTD., Seoul (KR); INNOSKY, Seoul (KR)

( * ) Notice: Subject to any disclaimer, the term of this patent is extended or adjusted under 35 U.S.C. 154(b) by 0 days.

(21) Appl. No.: 14/701,429

(22) Filed: Apr. 30, 2015

(65) Prior Publication Data

US 2016/0135240 A1 May 12, 2016

(30) Foreign Application Priority Data

Nov. 7, 2014 (KR) .................. 10-2014-0154807
Nov. 18, 2014 (KR) .................. 10-2014-0161232

(51) Int. Cl.
*H04W 76/14* (2018.01)
*H04W 56/00* (2009.01)
(Continued)

(52) U.S. Cl.
CPC ........... *H04W 76/14* (2018.02); *H04W 8/005* (2013.01); *H04W 56/001* (2013.01); *H04W 72/0446* (2013.01); *H04W 92/18* (2013.01)

(58) Field of Classification Search
CPC ........... H04W 76/023; H04W 72/0446; H04W 92/18; H04W 76/14; H04W 8/005; H04W 56/001
See application file for complete search history.

(56) References Cited

U.S. PATENT DOCUMENTS

| 2015/0009910 A1* | 1/2015 | Ryu | ............... H04W 72/04 370/329 |
| 2015/0208440 A1* | 7/2015 | Agiwal | ............... H04W 74/085 370/329 |

(Continued)

OTHER PUBLICATIONS

"3rd Generation Partnership Project; Technical Specification Group Radio Access Network; Evolved Universal Terrestrial Radio Access (E-UTRA); Physical channels and modulations (Release 12)," 3GPP TS 36.211 V12.3.0, Sep. 2014, pp. 1-124, 3GPP.

(Continued)

*Primary Examiner* — Kwang B Yao
*Assistant Examiner* — Moo Jeong
(74) *Attorney, Agent, or Firm* — Paratus Law Group, PLLC

(57) ABSTRACT

Provide is a method and apparatus for processing an initialization for a D2D communication between user equipments (UEs). The method includes: determining D2D subframes available for a D2D communication, the D2D subframes including a first D2D subframe and a second D2D subframe, each of the first D2D subframe and the second D2D subframe including a D2D slot corresponding to D2D slot number 0; and at a start of the D2D slot of the first D2D subframe and at a start of the D2D slot of the second D2D subframe, processing an initialization associated with a pseudo-random sequence of a D2D communication. The first D2D subframe and the second D2D subframe each include a D2D slot corresponding to D2D slot number 1. At least one of the first D2D subframe and the second D2D subframe corresponds to a non-zero subframe number of a radio frame.

6 Claims, 6 Drawing Sheets

(51) Int. Cl.
*H04W 8/00* (2009.01)
*H04W 72/04* (2009.01)
*H04W 92/18* (2009.01)

(56) References Cited

U.S. PATENT DOCUMENTS

| | | | |
|---|---|---|---|
| 2015/0230250 A1* | 8/2015 | Kim | H04W 72/0453 455/450 |
| 2015/0327315 A1* | 11/2015 | Xue | H04L 5/0044 370/330 |
| 2016/0057798 A1* | 2/2016 | Chae | H04B 1/713 370/280 |
| 2016/0286506 A1* | 9/2016 | Chae | H04W 56/002 |
| 2016/0337103 A1* | 11/2016 | Kim | H04L 5/0048 |
| 2018/0176973 A1* | 6/2018 | Kim | H04W 72/04 |

OTHER PUBLICATIONS

"3rd Generation Partnership Project; Technical Specification Group Radio Access Network; Evolved Universal Terrestrial Radio Access (E-UTRA); Physical layer procedures (Release 12)," 3GPP TS 36.213 V12.3.0, Sep. 2014, pp. 1-212, 3GPP.

* cited by examiner

APPARATUS AND METHOD FOR TRANSMITTING DEVICE TO DEVICE COMMUNICATION CHANNEL IN WIRELESS COMMUNICATION SYSTEM

CROSS-REFERENCE TO RELATED APPLICATIONS

This application claims priority from and the benefit of Korean Patent Application Nos. 10-2014-0154807, filed on Nov. 7, 2014, and 10-2014-0161232, filed on Nov. 18, 2014, the entire disclosures of each of which are incorporated herein by reference.

BACKGROUND

1. Field

Exemplary embodiments relate to a wireless communication, more particularly, to an apparatus and method for transmitting a communication channel between terminals in a wireless communication system.

2. Discussion of the Background

An amount of data transmitted through wireless communication has gradually increased. However, the frequency resources that service providers can provide are limited and have become increasingly saturated, and thus, mobile carriers continuously develop technologies for discovering new frequencies and improving efficient use of frequencies. One of the actively studied technologies to ease the frequency resource shortage and to create a new mobile communication service is Device-to-Device (D2D) communication technology. Representatively, the $3^{rd}$ Generation Partnership Project (3GPP), which is a mobile communication standardization association, actively conducts D2D communication technology standardization that is referred to as Proximity-based services (ProSe).

The D2D communication includes a communication between terminals, e.g., user equipments (UEs), located in proximity to each other, such that the terminals can directly send and receive data therebetween using the frequency band of, or out of the frequency band of, a wireless communication system using a communication technology of the wireless communication system without passing through the infrastructure of a base station, such as an evolved NodeB (eNodeB). This technology enables a UE to utilize a wireless communication when located out of the area in which wireless communication infrastructure is deployed, and provides an advantage of reducing network load in the wireless communication system.

Because the resources for D2D communication are limited, it may be necessary to exploit the limited resources effectively in performing wireless communications. For example, a communication problem may occur if a UE carrying out a D2D communication processes a baseband signal by using only existing parameters of the wireless communication system, such as parameters of LTE or LTE-Advanced system parameters, without using one or more parameters configured in consideration of the limited resource characteristics of the D2D communication.

SUMMARY

One or more exemplary embodiments provide a method and apparatus for transmitting a Device to Device (D2D) communication signal through a D2D communication channel in a wireless communication system.

One or more exemplary embodiments provide a method and apparatus for generating a pseudo random sequence for a D2D communication in a wireless communication system.

One or more exemplary embodiments provide a method and apparatus for providing a scrambling, a frequency hopping, and a group hopping for a D2D communication in a wireless communication system.

One or more exemplary embodiments provide a method of processing an initialization for a device-to-device (D2D) communication between user equipments (UEs), the method including: determining D2D subframes available for a D2D communication, the D2D subframes including a first D2D subframe and a second D2D subframe, each of the first D2D subframe and the second D2D subframe including a D2D slot corresponding to D2D slot number 0; and at a start of the D2D slot of the first D2D subframe and at a start of the D2D slot of the second D2D subframe, processing an initialization associated with a pseudo-random sequence of a D2D communication. Each of the first D2D subframe and the second D2D subframe further includes a D2D slot corresponding to D2D slot number 1. At least one of the first D2D subframe and the second D2D subframe corresponds to a non-zero subframe number of a radio frame.

One or more exemplary embodiments provide a user equipment (UE) to process an initialization for a device-to-device (D2D) communication with another UE, the UE including: a processor configured to determine D2D subframes available for a D2D communication, the D2D subframes including a first D2D subframe and a second D2D subframe, each of the first D2D subframe and the second D2D subframe including a D2D slot corresponding to D2D slot number 0, and at a start of the D2D slot of the first D2D subframe and at a start of the D2D slot of the second D2D subframe, configured to process an initialization associated with a pseudo-random sequence of a D2D communication; and a radio frequency signal transmitter to transceive a D2D signal associated with the pseudo-random sequence. Each of the first D2D subframe and the second D2D subframe further includes a D2D slot corresponding to D2D slot number 1. At least one of the first D2D subframe and the second D2D subframe corresponds to a non-zero subframe number of a radio frame.

One or more exemplary embodiments provide a method of processing an initialization for a device-to-device (D2D) communication between user equipments (UEs), the method including: indexing at least one of a D2D slot and a D2D subframe available for a D2D communication, the D2D subframe being included in a radio frame and including the D2D slot, the radio frame including at least one non-D2D subframe unavailable for a D2D communication; determining at least one of a D2D slot number associated with the D2D slot and a D2D subframe number associated with the D2D subframe, based on a modulo operation; and determining an initialization associated with a pseudo-random sequence of a D2D communication, the initialization being associated with the D2D slot or the D2D subframe. The at least one of the D2D slot and the D2D subframe has a non-zero index. The at least one of the D2D slot number associated with the D2D slot and the D2D subframe number associated with the D2D subframe is zero.

According to one or more exemplary embodiments, by defining an initial value of a pseudo-random sequence adaptive for a D2D communication and the determination time of the initial value, a transmitting UE may effectively configure a pseudo-random sequence for scrambling, frequency hopping and/or group hopping in accordance with D2D resource configurations.

DETAILED DESCRIPTION OF THE ILLUSTRATED EMBODIMENTS

Figure 1:
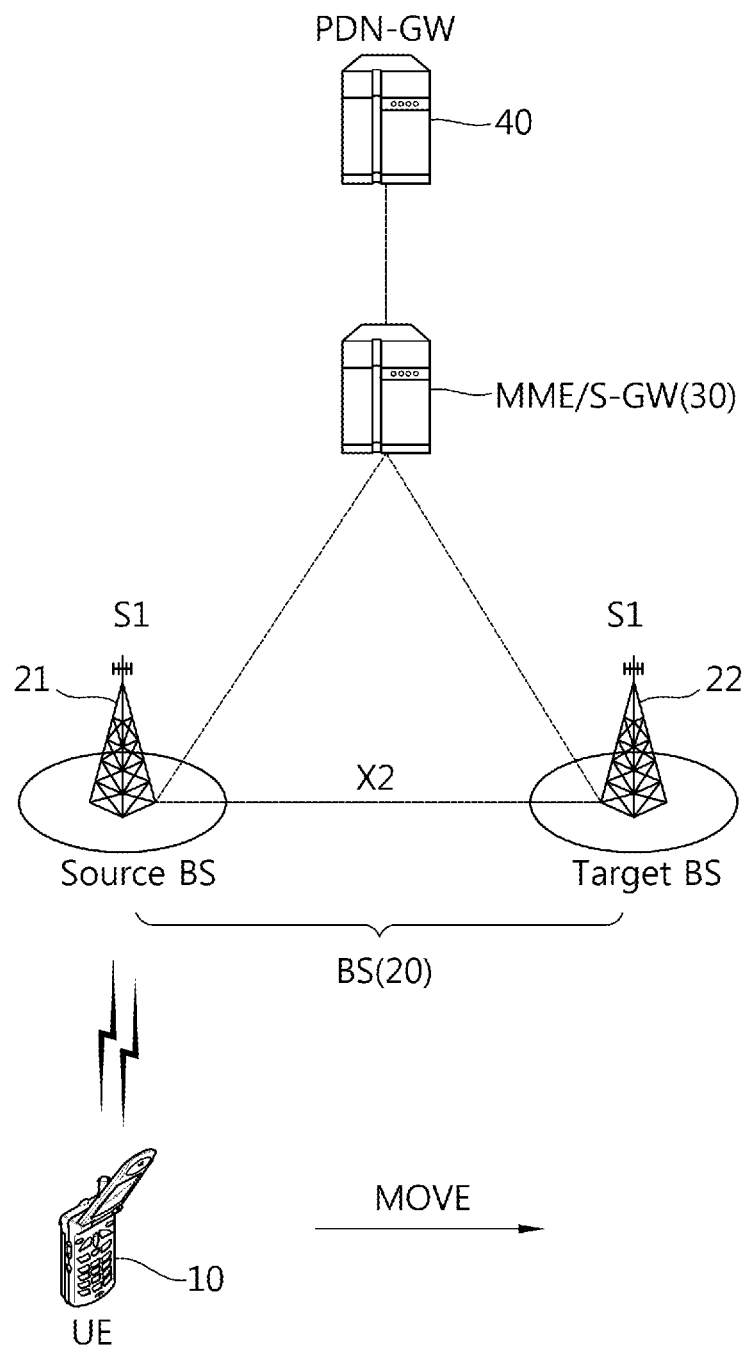
FIG. 1 is a diagram illustrating a network architecture of a wireless communication system, according to one or more exemplary embodiments.

Exemplary embodiments will be described more fully hereinafter with reference to the accompanying drawings, in which exemplary embodiments of inventive concept are shown. Throughout the drawings and the detailed description, unless otherwise described, the same drawing reference numerals are understood to refer to the same elements, features, and structures. In describing the exemplary embodiments, detailed description on known configurations or functions may be omitted for clarity and conciseness.

Further, the terms, such as first, second, A, B, (a), (b), and the like may be used herein to describe elements in the description herein. The terms are used to distinguish one element from another element. Thus, the terms do not limit the element, an arrangement order, a sequence or the like. It will be understood that when an element is referred to as being "on", "connected to" or "coupled to" another element, it can be directly on, connected or coupled to the other element or intervening elements may be present. The present specification provides descriptions in association with a wireless communication network, and tasks executed in the wireless communication network may be performed in the process where a system (for example, a base station) that manages the corresponding wireless communication network controls the network and transmits data, or may be performed in a User Equipment (UE) that is wireless linked to the corresponding network and capable of communicating with the network system.

The multiple access method applied to a wireless communication system may not be limited to certain technical schemes. Various methods and schemes can be used, including CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA. For uplink transmission and downlink transmission, either TDD (Time Division Duplex), which uses different time locations for uplink and downlink transmissions, respectively, or FDD (Frequency Division Duplex), which uses different frequencies for uplink and downlink transmissions, may be utilized. Further, both the TDD and FDD schemes may be used for uplink and downlink transmissions between a base station and a UE.

FIG. 1 is a diagram illustrating a network architecture of a wireless communication system, according to one or more exemplary embodiments.

FIG. 1 illustrates the network architecture of an Evolved-Universal Mobile Telecommunications System (E-UMTS), which is an example of a wireless communication system. The E-UMTS system may be Evolved-UMTS Terrestrial Radio Access (E-UTRA), Long Term Evolution (LTE), or LTE-advanced (LTE-A). Wireless communication technologies and/or protocols of a wireless communication system with which UEs communicate may be configured according to the respective network system. UEs are configured to communicate with a base station supporting one or more of the network architectures described herein.

A wireless communication system is widely deployed to provide various communication services, such as voice and packet data, etc. Also, a wireless communication system may support a device to device (D2D) communication between UEs. A wireless communication system supporting D2D communication will be described later in more detail.

Referring to FIG. 1, an Evolved-UMTS Terrestrial Radio Access Network (E-UTRAN) includes a base station (hereinafter referred to as an evolved NodeB (eNB) 20) that provides a terminal (hereinafter referred to as User Equipment (UE) 10) with a Control Plane (CP) and a User Plane (UP).

The UE 10 may be a stationary or mobile entity, and may be referred to as a Mobile station (MS), an Advanced MS (AMS), a User Terminal (UT), a Subscriber Station (SS), a wireless device, or the like.

The eNB 20 may generally refer to a station that communicates with the UE 10, and may be referred to as a Base Station (BS), a Base Transceiver System (BTS), an access point, a femto-eNB, a pico-eNB, a Home eNB, a relay, or the like.

The eNB 20 may provide at least one cell to a UE. A cell may refer to a geographical area in which the eNB 20 provides a communication service, or a specific frequency band. A cell may refer to downlink frequency resource and/or uplink frequency resource. Also a cell may refer to the combination of downlink frequency resource and optional uplink frequency resource. Also, if carrier aggregation (CA) is not considered, uplink and downlink frequency resources generally exist in pairs within a cell.

An interface for transmitting user traffic or control traffic may be used between eNBs 20. A source eNB 21 may refer to an eNB which has established a wireless bearer with a UE 10 currently, and a target eNB 22 mar refer to an eNB, which a UE 10 that disconnects a wireless bearer with a source eNB 21 attempts to handover to and establish a new wireless bearer with.

eNBs 20 may be connected with each other via an X2 interface, which is used to send and receive a message between eNBs 20. An eNB 20 is connected to an Evolved Packet System (EPS), more specifically Mobility Management Entity (MME)/Serving Gateway (S-GW) 30, via S1 interface. S1 interface supports many-to-many-relation between eNBs 20 and MME/S-GWs 30. PDN-GW 40 is utilized to provide packet data service toward MME/S-GW 30. PDN-GW 40 varies depending on the purpose of communication or service, and PDN-GW 40 supporting a specific service can be found using Access Point Name (APN) information.

Hereinafter, the term "downlink" refers to a communication from a base station to a UE, and the term "uplink" refers to a communication from a UE to a base station. For downlink, a transmitter may be part of a base station, and a receiver may be part of a UE. For uplink, a transmitter may be part of a UE and a receiver may be part of a base station. The base station may include an eNB, a relay, and the like as described above, for example. There is no limitation in the multiple access method applied to a wireless communication system.

The wireless communication system may include a radio protocol architecture associated with a user plane and a radio protocol architecture associated with a control plane, according to one or more exemplary embodiments. The user plane indicates a protocol stack for user data transmission, and the control plane indicates a protocol stack for control signal transmission.

Physical (PHY) layers of a UE and an eNB provide an information transfer service to a higher layer using a physical channel. A physical (PHY) layer is connected to a Media Access Control layer which is a higher layer, through a transport channel. Data is transferred, through a transport channel, between the MAC layer and the physical layer. The transport channel is classified based on a scheme of transmitting data through a radio interface. In addition, data is transferred through a physical channel between different physical layers (that is, between physical layers of a UE and an eNB, between physical layers of a transmitter and a receiver). The physical channel may be modulated based on an Orthogonal Frequency Division Multiplexing (OFDM) scheme, and uses a space formed of time and frequencies, and a space formed of a plurality of antennas as radio resources. Hereinafter, examples of physical control channels will be described.

A Physical Downlink Control CHannel (PDCCH) among physical channels may inform a UE of resource allocations of a Paging CHannel (PCH) and a DownLink Shared CHannel (DL-SCH) and Hybrid Automatic Repeat Request (HARQ) information associated with a DL-SCH. A PDCCH may deliver, to a UE, uplink scheduling grant which reports resource allocation of uplink transmission. A Physical Control Format Indicator CHannel (PCFICH) informs a UE of the number of OFDM symbols used for PDCCHs, and is transmitted in each subframe. A Physical Hybrid ARQ Indicator CHannel (PHICH) carries a HARQ ACK/NACK signal as a response to uplink transmission. A Physical Uplink Control CHannel (PUCCH) delivers HARQ ACK/NACK with respect to downlink transmission and uplink control information such as a scheduling request and a Channel Quality Indicator (CQI). A Physical Uplink Shared CHannel (PUSCH) delivers an UpLink Shared CHannel (UL-SCH). The PUSCH may include HARQ ACK/NACK and Channel State Information (CSI) such as a CQI. Recently, methods for carrying out discovery and direct communication between in-coverage or out-of-coverage devices in a network have been studied for the purpose of public safety, etc. A UE performing D2D communication may be referred to as a D2D UE. Further, a UE transmitting a signal based on a D2D communication may be referred to as a transmitting (Tx) UE, and a UE receiving a signal based on a D2D communication may be referred as a receiving (Rx) UE. A Tx UE may transmit a discovery signal, and an Rx UE may receive the discovery signal. A Tx UE and an Rx UE may exchange their roles therebetween. Further, a signal transmitted by a Tx UE can be received by two or more Rx UEs. Also, D2D communication between a Tx UE and an Rx UE may be called a sidelink, which is distinct from existing uplink and downlink between an evolved NodeB and a UE.

Hereinafter, a UE is assumed to support D2D communication. A UE supporting a D2D communication may carry out a D2D communication if a user of the terminal switches it on (from switched off state) to make the UE D2D-enabled by manipulating User Interface (UI). Further, a UE may be operated in a D2D-enabled configuration consistently, in accordance with the characteristics of the UE (e.g., a terminal manufactured for public purposes) or subscriber policy (e.g., public safety plan, etc.).

Also, network (for example, a D2D server which manages a ProSe (Proximity Services) ID and a ProSe application ID, a serving base station of a corresponding UE) may determine whether a D2D communication is granted at a UE in which its user enabled a D2D communication. More specifically, the UE may carry out a D2D communication only when a D2D communication is granted by a network even though the UE has been enabled to use a D2D communication by the user. Information on whether D2D is granted may be output on a display of the UE.

The resources for a D2D communication may be allocated by a UE, e.g., a cluster head, responsible for allocating the resources for a D2D communication or a base station. A UE may need to transmit buffer status report (BSR) for D2D data to the base station or the cluster head during a D2D communication. The base station and the cluster head may be referred to as a base station collectively for convenience of description.

The load at a base station can be distributed and reduced if adjacent UEs perform D2D communications in a cellular system. Also, when adjacent UEs carry out D2D communications, UE's transmission power consumption and transmission latency may be reduced because UEs send data to a target located within a relatively short distance. Moreover, from the perspective the whole system, frequency utilization effectiveness is enhanced because existing cellular-based communication and D2D communication use the same resources.

D2D communication may be classified into a communication method of in-coverage UE, which is located in network coverage (base station coverage) and a communication method of out-of-coverage UE, which is located out of network coverage. Also, D2D may be referred to as Proximity based Service (ProSe) or ProSe-D2D. The usage of the term ProSe for D2D is intended not to change the meaning of technology transceiving data directly between UEs, but to indicate the features of proximity-based service in addition to the device-to-device communication.

Figure 2:
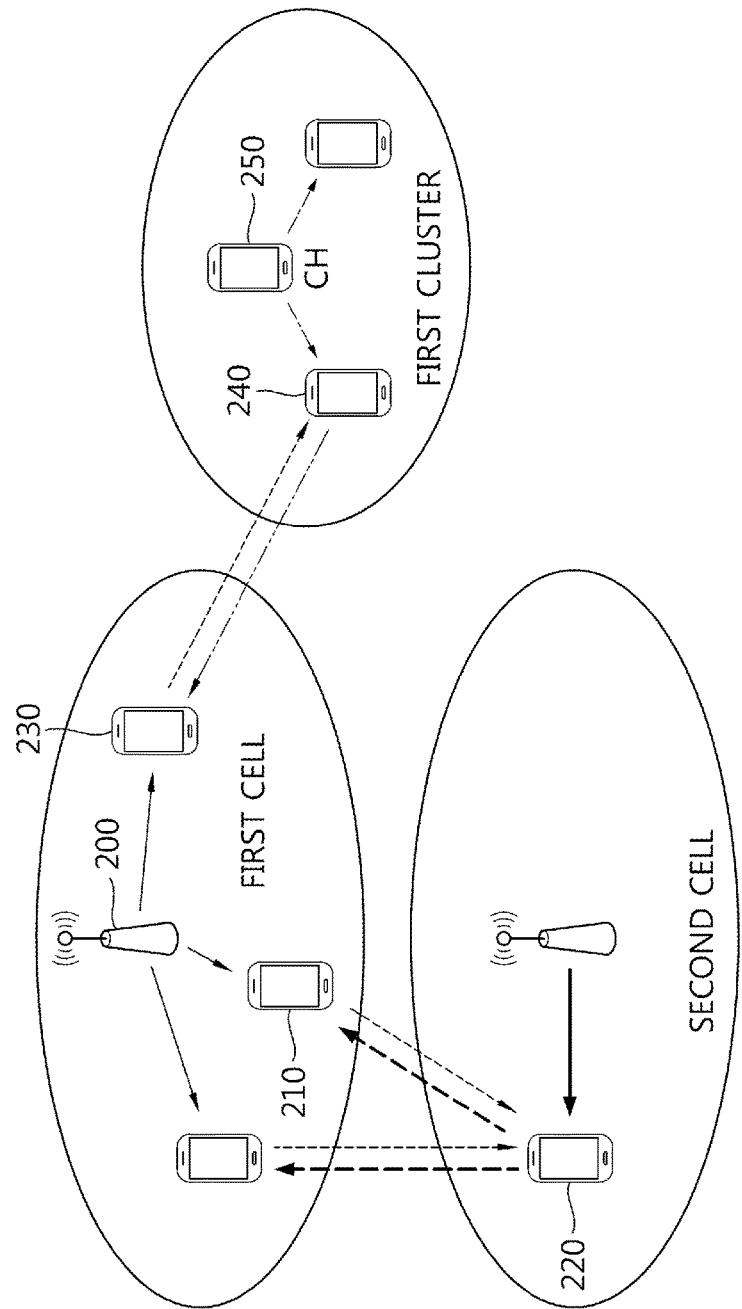
FIG. 2 is a diagram illustrating a concept of cellular network-based Device-to-Device (D2D) communication, according to one or more exemplary embodiments.

FIG. 2 is a diagram illustrating a concept of cellular network-based Device-to-Device (D2D) communication, according to one or more exemplary embodiments.

Referring to FIG. 2, the communication between a first UE 210 located in a first cell and a second UE 220 located in a second cell may be D2D communication between a UE included in a network coverage and a UE included in the network coverage. In addition, the communication between a third UE 230 located in the first cell and a forth UE 240 located in a first cluster may be D2D communication between a UE included in a network coverage and a UE located outside the network coverage. The communication between the fourth UE 240 located in the first cluster and a fifth UE 250 located in the first cluster may be D2D communication between two UEs located outside the network coverage.

A fifth UE 250 may operate as a Cluster Head (CH) in a first cluster. A cluster head refers to a UE responsible for allocating resources. The cluster head may include an independent synchronization source (ISS) for synchronizing out-of-coverage UEs. An ISS is a synchronization source other than a base station, which does not induce transmission synchronization from other D2D synchronization sources.

In one or more exemplary embodiments, in carrying out a D2D communication, a base station 200 may transmit Downlink Control Information (DCI) to a first UE 210, where the Downlink Control Information may include control information for indicating D2D scheduling assignment (SA) information, which will be transmitted from the first UE 210 to other D2D UEs. The first UE 210 is a UE located within the coverage of the base station 200. In a D2D communication from a first UE 210 to other D2D UEs (e.g., a second UE 220), D2D SA information may include allocation information about available transmission resources and/or reception resource and other control information.

A first UE 210, which received Downlink Control Information including control information for indicating D2D SA information from base station, may transmit D2D SA information to a second UE 220. The second terminal 220 may be a UE located out of the coverage of the base station 220. The first UE 210 and the second UE 220 may perform D2D communication based on D2D SA information. Specifically, the D2D communication may include: receiving, at the second UE 220, D2D SA information; based on the D2D SA information, obtaining information indicating resources in which D2D data of the first UE 210 is transmitted; and receiving, from the first UE 210 to the second UE 220, data via information indicating resources in which D2D data of the first UE 210 is transmitted.

Various signals may be used for D2D communication. Some definitions are presented below, but are not limited as such.

First, as a synchronization signal for D2D communication between UEs (D2DSS), there are Primary D2D Synchronization Signal (PD2DSS) and Secondary D2D Synchronization Signal (SD2DSS). Here the entity transmitting a synchronization signal refers to D2D Synchronization Source (D2D SS), and information identifying D2D SS is referred to as Physical Synchronization Source Identity (PSSID).

D2D SS is a node capable of transmitting D2D synchronization signal, where transmitting D2D (Tx D2D) Synchronization Source is a source from which a UE receives a D2D synchronization signal, and Original D2D Synchronization Source is a source from which a D2D synchronization signal is originated.

D2D $SS_{ue\_net}$ is a set of D2DSS sequences transmitted from a UE when a transmission timing reference is an eNB, and D2D $SS_{ue\_oon}$ is a set of D2DSS sequences transmitted from a UE when a transmission timing reference is not an eNB.

Next, one of channels in which system information related to D2D communication or information related to synchronization is transmitted includes Physical D2D Synchronization Channel (PD2DSCH). The examples of control information transmitted on PD2DSCH are D2D frame number (DFN) and out-of-coverage D2D resource pool, and other control information may be included in PD2DSCH and indicated.

In a D2D communication, physical layer control information may be transmitted on Physical Sidelink Control Channel (PSCCH). In this configuration, the physical layer control information includes Scheduling Assignment (SA) information. Although PSCCH is similar to PUSCH format for Wide Area Network (WAN) communication such as LTE, it corresponds to ProSe dedicated physical channel for transmitting physical layer control information. More specifically, although PSCCH format may be similar to the PUSCH format at least in part, some or all of parameters may be provided as values different from those of a physical channel for a WAN transmission. Further, actual traffic data distinguished from physical layer control information in D2D communication may be referred to as the term D2D data.

As described above, since the path for D2D communication may be called sidelink, the term PD2DSCH may include Physical Sidelink Broadcast Channel (PSBCH). Also PSSID may indicate Physical Sidelink Synchronization Identity as well as Physical Synchronization Source Identity.

In a D2D communication, a UE may operate in a first mode and a second mode. The first mode is a mode in which the UE is capable of carrying out D2D communication only when the UE has been assigned resources for a D2D communication from a base station, where a base station sends a D2D grant to a transmitting UE, which transmits a D2D signal to another UE. The D2D grant provides the transmitting UE with parameter information that needs to be decided by a base station among pieces of Scheduling Assignment (SA) information that needs to be obtained at a receiving UE for D2D data reception in a D2D communication, resource allocation information for the SA, and resource allocation information for data indicated by the SA. The parameter information that needs to be decided by the base station includes resource allocation information for data indicated by the SA. The D2D grant is forwarded to a transmitting UE in Downlink Control Information (DCI), and may be carried in Physical Downlink Control Channel (PDCCH) or Enhanced PDCCH (EPDCCH). The D2D grant may be control information with its distinct D2D purpose indicated by uplink grant or D2D-RNTI assigned to each UE. The D2D grant may be referred to as SA/data grant.

To begin a D2D communication between UEs in the first mode, D2D resource pool may need to be defined in advance. D2D resource pool refers to a set of necessary resources for control information related to D2D communication or data transmission and reception, including resources for D2D scheduling assignment (SA) transmission ("resource for receiving D2D SA" from the perspective of D2D receiving UE), resources for D2D data transmission and reception, resources for transmitting a discovery signal ("resources for receiving a discovery signal" from the perspective of D2D receiving UE), etc. Basically, D2D communication utilizes uplink subframes in which an opportunity for a UE to transmit a signal. Accordingly, in a Frequency Division Duplex (FDD) system, every subframe can be a candidate for D2D resource pool, and in a Time Division Duplex (TDD) system, one or more uplink subframes determined according to TDD UL-DL configuration can be a candidate for D2D resource pool.

Figure 3:
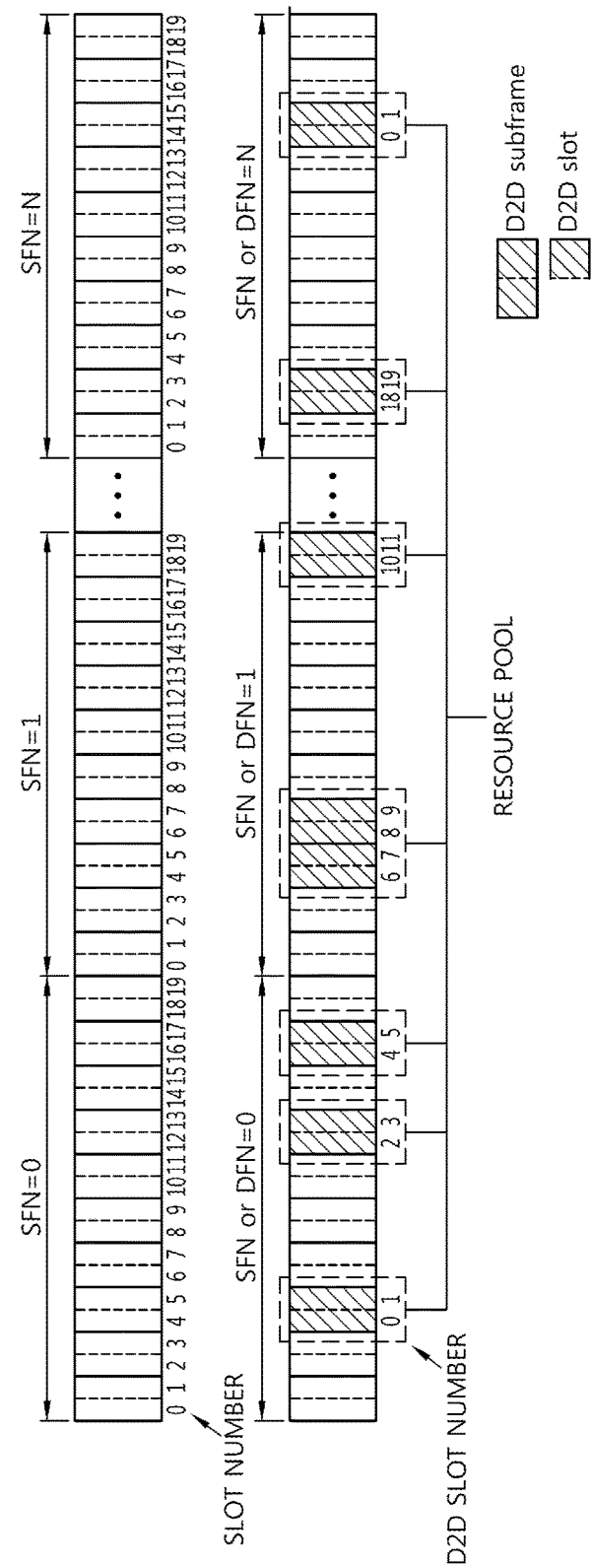
FIG. 3 is a diagram illustrating a concept of a slot in a D2D communication and a resource pool utilized in the D2D communication, according to one or more exemplary embodiments.

FIG. 3 is a diagram illustrating a concept of resource pool used for D2D communication and a slot in D2D communication, according to one or more exemplary embodiments.

Referring to FIG. 3, in a LTE frame structure at the top, each frame is assigned system frame number (SFN) 0, 1, . . . , N, where each frame includes 10 subframes. Each subframe includes 2 slots, where the number of each slot $n_s$ is given 0~19 in a frame. Also the slot number begins from 0 again once when frame is changed. Here, resources for a UE is allocated in all frames, all subframes, and all slots so that a communication is available.

In a D2D frame structure at the bottom, the concept of SFN (or DFN (D2D frame number)) is identical with the frame structure at the top. However, since D2D communication is possible only in a D2D resource pool prepared for D2D communication, the D2D frame structure at the bottom is different from the frame structure at the top where D2D communication is possible in all frames, all subframes, and all slots.

Hereinafter, subframes included in a D2D resource pool are referred to as D2D subframes, and slots included in a D2D resource pool are referred to as D2D slots. Also, the subframes, which are D2D subframes included in a D2D resource pool, used for transmitting synchronization signals, Primary D2D Synchronization Signal (PD2DSS) and Secondary D2D Synchronization Signal (SD2DSS), are referred as D2DSS subframes. In a D2DSS subframe, Physical D2D Synchronization Channel (PD2DSCH) is also transmitted which will be described later.

Likewise, as a D2D subframe included in the D2D resource pool, a subframe used for transmitting data in a D2D communication may be referred as D2D data subframe; considering that Physical Sidelink Share Channel (PSSCH) is a channel used for data transmission in the D2D communication, and the D2D subframe may be referred to as PSSCH subframe.

Further, as a D2D subframe included in the D2D resource pool, the subframe used for transmitting control information such as D2D SA, etc. may be referred as D2D SA subframe; considering that Physical Sidelink Control Channel (PSCCH) is the channel used for transmitting control information such as D2D SA, etc., the D2D subframe may be referred to as PSCCH subframe.

Further, as a D2D subframe included in the D2D resource pool, a subframe used for transmitting a D2D discovery signal may be referred as D2D discovery subframe; considering that the channel used for transmitting the D2D discovery signal is Physical Sidelink Discovery Channel (PSDCH), the D2D subframe may be referred to as PSDCH subframe.

Moreover, PD2DSCH is a channel used for transmitting broadcast information in D2D communication, and may be referred to as Physical Sidelink Broadcast Channel (PSBCH) as described above, and the D2D subframe in which PD2DSCH is transmitted may be referred as PSBCH subframe. Also, since PD2DSCH is also transmitted in D2DSS subframe as stated above, the PSBCH subframe and the D2DSS subframe may be the same subframe.

Figure 4:
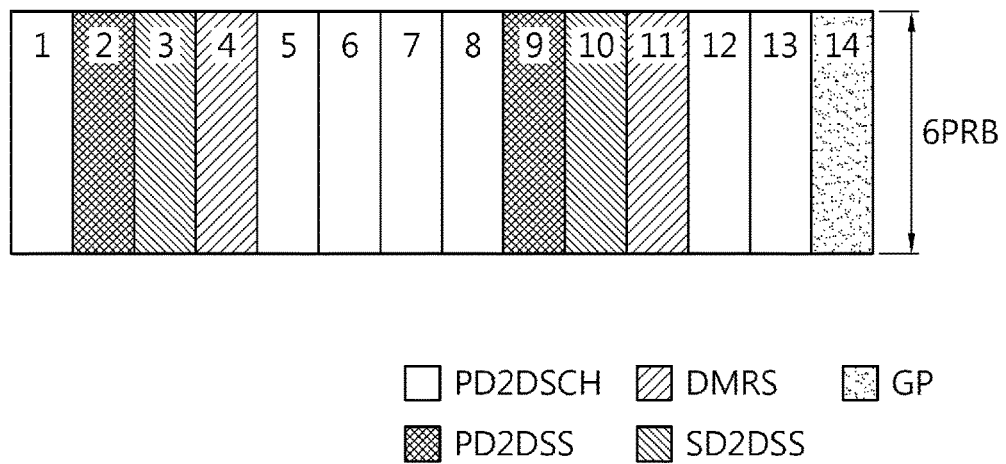
FIG. 4 is a diagram illustrating a subframe structure of D2DSS, according to one or more exemplary embodiments.

For example, a D2DSS subframe may have the structure as shown in FIG. 4, but not limited as such. Referring to FIG. 4, a D2DSS subframe in a normal cyclic prefix (CP) includes total 14 OFDM symbols in a time axis and total 6 physical resource blocks (PRBs) in a frequency axis. Among 14 OFDM symbols, OFDM symbols corresponding to OFDM symbol numbers 1, 5, 6, 7, 8, 12, 13 are assigned to PD2DSCH, OFDM symbols corresponding to OFDM symbol numbers 2, 9 are assigned to PD2DSS, OFDM symbols corresponding to OFDM symbol numbers 3, 10 are assigned to SD2DSS, OFDM symbols corresponding to OFDM symbol numbers 4, 11 are assigned to DMRS, OFDM symbol corresponding to OFDM symbol number 14 is used as guard period (GP). The transmission period of D2DSS subframe may be 40 ms.

D2DSS may be transmitted in the D2DSS subframe. D2DSS includes PD2DSS and SD2DSS. As shown in FIG. 4, PD2DSS and SD2DSS may be transmitted using two symbols, respectively, in the D2DSS subframe. Also as shown in FIG. 4, PD2DSCH may be transmitted in the D2DSS subframe, where Demodulation Reference Signal (DM-RS) may be transmitted as a demodulation reference signal for PD2DSCH. FIG. 4 is just an example, so the exact symbol position may be defined differently in a different position in the synchronization subframe, except that two symbols are used for PD2DSS and SD2DSS, respectively.

Referring to FIG. 3, in the second mode, D2D slot number is obtained by re-indexing an index value consecutively from 0 to the slots which belong to a D2D resource pool and applying a modulo-20 operation on each index value. For example, the index values in a D2D resource pool are 0, 1, 2, . . . , 18, 19, 20, 21, . . . , and by applying modulo-20 operation to each index value, D2D slot numbers 0, 1, 2, . . . , 18, 19, 0, 1, . . . are generated. D2D slot numbers are assigned regardless of SFN or DFN, and all of D2D slot numbers 0~19 need not to be located within one frame.

In the first mode, D2D slot number is obtained by assigning, contiguously from 0, index values for the slots belonging to uplink subframes between scheduling assignment periods and applying modulo-20 operation on an index value.

D2D slot number may be represented by $n_{s\_D2D}$, but not limited as such.

Similarly, D2D subframe number may be defined. Regarding D2D subframes as shown in FIG. 3, in the second mode, D2D subframe number is obtained by re-indexing index values for D2D subframes in a D2D resource pool contiguously from 0 and applying modulo-10 operation on each index value. For example, where the index value of D2D subframe in a D2D resource pool is 0, 1, 2, . . . , 8, 9, 10, 11, . . . , application of modulo-10 operation to each index value yields D2D subframe numbers 0, 1, 2, . . . , 8, 9, 0, 1, . . . . That is, D2D subframe numbers are given regardless of SFN or DFN, and all of D2D subframe number 0~9 are not necessarily located within one frame. In the first mode, D2D subframe number is obtained by assigning, contiguously from 0, index values for the subframes belonging to uplink subframes between scheduling assignment periods and applying modulo-10 operation on each index value.

D2D subframe number may be expressed as $n_{sf\_D2D}$, but not limited as such. Also, the relationship between D2D slot number and D2D subframe number can be represented as $n_{sf\_D2D} = \lfloor n_{s\_D2D}/2 \rfloor$. That is, an integer obtained by rounding down the half of D2D slot number by 2 is D2D subframe number.

As stated above, D2D slot number is a value obtained by re-indexing, contiguously from 0, index values for the slots in a D2D resource pool and applying modulo-20 operation to each of the indexed value. Here, the indexed values just before applying the modulo-20 operation to D2D slot number may be defined as 'D2D slot number before modulo-20 operation'. The D2D slot number before modulo-20 operation may be expressed as $n_{ss}$ which is the number of sidelink slot (ss). Particularly, in case where the $n_{ss}$ is for the slots defined on PSSCH, which is a channel used for data transmission in D2D communication, it may be expressed as $n_{ss}^{PSSCH}$, but is not limited as such.

In accordance with the above definitions described herein, the relationship between $n_{s\_D2D}$ and $n_{ss}$ (or $n_{ss}^{PSSCH}$) may be expressed as $n_{s\_D2D} = (n_{ss}) \bmod 20$ (or $n_{s\_D2D} = (n_{ss}^{PSSCH}) \bmod 20$).

As explained in the above, D2D subframe number is a value obtained by re-indexing, contiguously from 0, index values for subframes in a D2D resource pool and applying modulo-10 operation to each index value. Here, the value just before applying modulo-10 operation to D2D subframe number may be defined as 'D2D subframe number before modulo-10 operation'. The D2D subframe number before modulo-10 operation may be expressed as $n_{ssf}$ which is the number of sidelink subframe (ssf), but is not limited as such. Specifically, in case where the $n_{ssf}$ is for the slots defined on PSSCH which is a channel used for data transmission in D2D communication, it may be expressed as $n_{ssf}^{PSSCH}$, but is not limited as such. Further, the relationship between $n_{ss}$ (or $n_{ss}^{PSSCH}$) and $n_{ssf}$ (or $n_{ssf}^{PSSCH}$) may be expressed as $n_{ss}=\lfloor n_{ssf}/2 \rfloor$ (or $n_{ss}^{PSSCH}=\lfloor n_{ssf}^{PSSCH}/2 \rfloor$).

In accordance with the definitions presented herein, the relationship between $n_{sf\_D2D}$ and $n_{ssf}$ (or $n_{ssf}^{PSSCH}$) may be expressed as $n_{sf\_D2D}=(n_{ssf})$mod 10 (or $n_{sf\_D2D}=(n_{ssf}^{PSSCH})$ mod 10).

Figure 5:
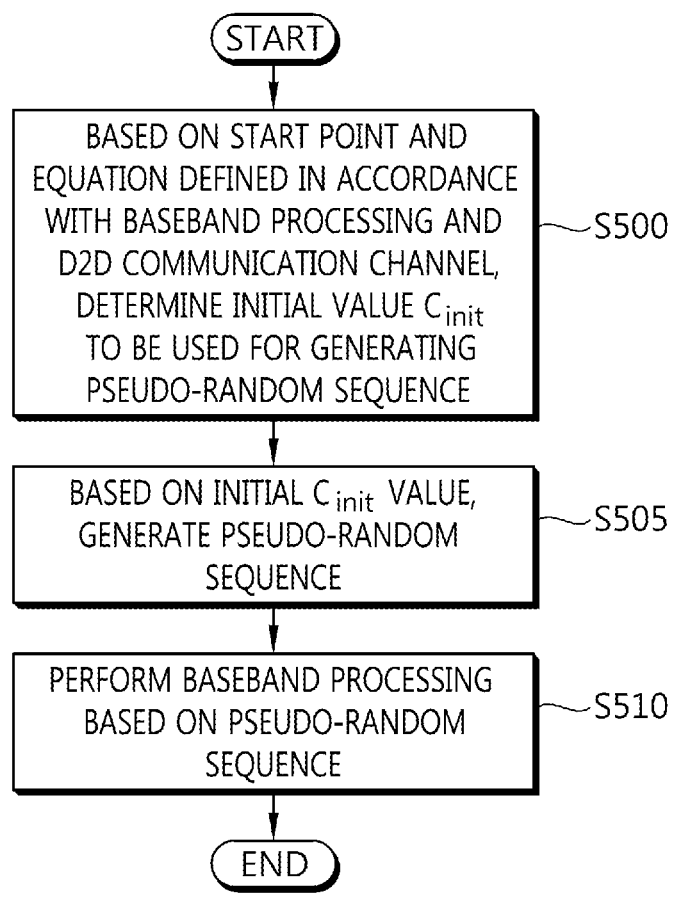
FIG. 5 is a flowchart illustrating an example of a method of transmitting a D2D communication signal through a D2D communication channel, according to one or more exemplary embodiments.

FIG. 5 is a flowchart illustrating an example of a method of transmitting a D2D communication signal through a D2D communication channel, according to one or more exemplary embodiments.

Referring to FIG. 5, a UE computes an initial value $c_{init}$ to be used for generating pseudo-random sequence c(i) at a determined start point, such as at the start of each D2D subframe (first start points), in each D2D slot (or at the beginning (or start) of each D2D slot) fulfilling $n_{s\_D2D}=0$ (second start points) and at the start of each D2DSS subframe (third start points), etc.

According to one or more exemplary embodiments, the first start points correspond to the start of each D2D subframe. Here, when the D2D subframe is a PSSCH subframe as described in the above, the start of each D2D subframe are referred to as the start of each (or every) PSSCH subframe.

Further, according to one or more exemplary embodiments, second start points correspond to each D2D slot (or at the beginning (or start) of each D2D slot) fulfilling $n_{s\_D2D}=0$. Here, as described in the above, the start point of D2D slot corresponding to the slot number of 0 has the same meaning as the start point of D2D subframe corresponding to the subframe number of 0, the start point of D2D slot having a slot number, which corresponds to zero after applying modulo-20 operation, the start point of D2D subframe having a subframe number, which corresponds to zero after applying modulo-10 operation.

Accordingly, the start point of D2D slot having slot number 0 may be expressed as the start point of D2D subframe having subframe number 0. Specifically, the start point of D2D slot having slot number 0 may be expressed as 'in each D2D slot (or at the beginning (or start) of each D2D slot) fulfilling $n_{sf\_D2D}=0$' and as the same meaning of 'in each D2D slot (or at the beginning (or start) of each (or every) D2D slot) fulfilling $n_{ss}$ mod 20=0 (or $n_{ss}^{PSSCH}$ mod 20=0)'. Further, the start point of D2D subframe having the subframe number 0 may be expressed as 'in each D2D subframe (or at the beginning (or start) of each (or every) D2D subframe) fulfilling $n_{sf\_D2D}=0$' or 'in each D2D subframe (or at the beginning (or start) of each (or every) D2D subframe) fulfilling $n_{ssf}$ mod 10=0 (or $n_{ssf}^{PSSCH}$ mod 10=0)'.

According to one or more exemplary embodiments, third start points correspond to the start point of each D2DSS subframe. Here, if the D2DSS subframe is identical to PSBCH subframe as described in the above, the start point of each D2DSS subframe corresponds to the start point of each (or every) PSBCH subframe.

The first start points, second start points, and third start points will be described in more detail below. With the example of the bottom frame structure in FIG. 3, if it is assumed that D2D subframe number starts from 0 in frame with SFN=0, first start points in the frame having frame number SFN=0 illustrated in the bottom of FIG. 3 include the start point of D2D subframe #2, the start point of D2D subframe #6, and the start point of D2D subframe #8.

For example, the second start points illustrated in the bottom of FIG. 3 include the start point of D2D slot having slot number 0 (zero) in a frame with SFN=0 and the start point of D2D slot having slot number 0 (zero) in a frame with SFN=N.

A third start point may refer to the start point of a subframe in which D2DSS is transmitted, and if the period of D2DSS subframe is assumed to be 40 ms, it can be expressed as in each radio frame (or at the beginning (or start) of each radio frame) fulfilling $(n_{f\_D2D})$mod 4=A, where $n_{f\_D2D}$ indicates a SFN or DFN in D2D and A is one selected from among 0, 1, 2 and 3. Here, A can be set to one value (e.g., A=0), or configured by higher layer signaling.

Here, the initial value $c_{init}$ may be computed based on the types of a D2D communication channel for which a corresponding pseudo-random sequence is used, and equation and the start points defined by baseband processing.

<D2D Data Transmission Channel>

In an exemplary embodiment, when a UE attempts to transmit D2D data on Physical Sidelink Share Channel (PSSCH) which is a D2D communication channel, the PSCCH may have a format similar to that of Physical Uplink Shared Channel (PUSCH) in WAN communication such as LTE, etc.

In this configuration, an initial value $c_{init}$ which is used for scrambling of a codeword on PSSCH is computed at first start points, and the following equation is used.

$$c_{init}=(SAID) \cdot 2^{14}+\lfloor n_{S\_D2D}/2 \rfloor \cdot 2^9+510 \quad \text{[Equation 1]}$$

Equation 1 is derived from the following equation 2 which computes an initial value $c_{init}$ used for scrambling a codeword on PUSCH by substituting SA ID that is an ID included in Scheduling Assignment (SA) for a radio network temporary identifier (RNTI) $n_{RNTI}$, setting the index of codeword with q as zero, substituting a D2D slot number $n_{s\_D2D}$ for slot number $n_s$, and setting $N_{ID}^{CELL}$ as 510.

$$c_{init}=n_{RNTI} \cdot 2^{14}+q \cdot 2^{13}+\lfloor n_s/2 \rfloor \cdot 2^9+N_{ID}^{cell} \quad \text{[Equation 2]}$$

According to an exemplary embodiment, when a UE attempts to transmit D2D data on PSSCH which is a D2D communication channel, an initial value $c_{init}$, which is used for frequency hopping for resource blocks assigned for the transmission of PSSCH, is computed at the second start points, and the following equation is used.

$$c_{init}=510 \quad \text{[Equation 3]}$$

Equation 3 is derived from the following equation 4, which computes an initial value $c_{init}$ used in frequency hopping for resource block assigned for the transmission of PUSCH, by substituting 0 (in case of TDD) for SFN $n_f$, and setting $N_{ID}^{CELL}$ as 510.

FDD: $c_{init}=N_{ID}^{cell}$

TDD: $c_{init}=2^9 \cdot (n_f \text{ mod } 4)+N_{ID}^{cell}$ [Equation 4]

According to an exemplary embodiment, when a UE attempts to transmit D2D data on PSSCH which is a D2D communication channel, an initial value $c_{init}$, which is used for group hopping of Demodulation Reference Signal (DM-RS) that is a reference signal for demodulation on the PSSCH, is computed at the second start points, and the following equation is used.

$$c_{init} = \left\lfloor \frac{(SAID)}{30} \right\rfloor \quad \text{[Equation 5]}$$

Equation 5 is derived from the following equation 6 which computes an initial value $c_{init}$ that is used for group hopping of demodulation reference signal which is a reference signal for the demodulation of PUSCH, by substituting an identifier SA ID included in a scheduling assignment for an identity (ID) $n_{ID}^{RS}$ for the reference signal. Computing group hopping of a demodulation reference signal which is a reference signal for demodulating PSSCH or PUSCH may be referred to as computing DM-RS base sequence.

$$c_{init} = \left\lfloor \frac{n_{ID}^{RS}}{30} \right\rfloor \quad \text{[Equation 6]}$$

<PD2DSCH Channel>

For PD2DSCH channel, following parameters may be configured.

TABLE 1

| Baseband Signal Processing | Parameter | PD2DSCH configuration |
|---|---|---|
| Scrambling | Cell ID | PSSID |
| | RNTI | independent of UE ID(=fixed to 0) |
| | Slot number | independent of the slot number (=fixed to 0) |
| | Codeword index | fixed to 0 |
| DMRS base sequence | Group hopping | Enabled |
| | Sequence hopping | Disabled |
| | Δshift | 0 |
| | Cell ID | PSSID |
| DMRS | CS(cyclic shift) | A first embodiment: 0 |
| | | A second embodiment: |
| | | By PSSID bit 1, 2, 3 |
| | OCC (orthogonal cover code) | A first embodiment: Fixed to [1 1] |
| | | A second embodiment: |
| | | By PSSID bit 0 |

Referring to Table 1, in the baseband signal processing to generate PD2DSCH, each parameter is configured to comply with PD2DSCH when scrambling and generating DM-RS base sequence (group hopping) and DM-RS. The processing of the initial value of pseudo-random sequence and baseband processing is as follows. Here, the PD2DSCH may have the same format as that of PUSCH in WAN communication such as LTE, etc.

According to an exemplary embodiment, when a UE attempts to transmit PD2DSCH, an initial value $c_{init}$ is computed at the third starts used for scrambling a codeword on the PD2DSCH, and the following equation is used.

$$c_{init} = (PSSID) \quad \text{[Equation 7]}$$

Equation 7 is derived from the following equation 8 which computes an initial value $c_{init}$ used for scrambling a codeword on PUSCH, by setting wireless network temporary identifier $n_{RNTI}$ to 0 regardless of a UE ID, setting the index of the codeword as q=0, setting slot number $n_s$ to 0 regardless of D2D slot number, and substituting PSSID for a cell ID $N_{ID}^{CELL}$.

$$c_{init} = n_{RNTI} \cdot 2^{14} + q \cdot 2^{13} + \lfloor n_S/2 \rfloor \cdot 2^9 + N_{ID}^{cell} \quad \text{[Equation 8]}$$

According to an exemplary embodiment, when a UE attempts to transmit PD2DSCH, an initial value $c_{init}$, which is used for frequency hopping of resource block assigned for the PD2DSCH transmission, is computed at the third start points, and the following equation is used.

$$c_{init} = (PSSID) \quad \text{[Equation 9]}$$

Equation 9 is derived from the following equation 10 which computes an initial value $c_{init}$ used in frequency hopping of resource block assigned for PUSCH transmission, by substituting 0 for SFN $n_f$ (in case of TDD), and substituting PSSID for a cell ID $N_{ID}^{CELL}$.

$$\text{FDD: } c_{init} = N_{ID}^{cell}$$

$$\text{TDD: } c_{init} = 2^9 \cdot (n_f \bmod 4) + N_{ID}^{cell} \quad \text{[Equation 10]}$$

According to an exemplary embodiment, when a UE attempts to transmit PD2DSCH, an initial value $c_{init}$, which is used for group hopping of demodulation reference signal which is a reference signal for the demodulation of the PD2DSCH, is computed at the third start points, and the following equation is used.

$$c_{init} = \left\lfloor \frac{(PSSID)}{30} \right\rfloor \quad \text{[Equation 11]}$$

Equation 11 is derived from the following equation 12 which computes an initial value $c_{init}$ used for group hopping of demodulation reference signal which is a reference signal for the demodulation of PUSCH, by substituting PSSID for an ID $n_{ID}^{RS}$ of the reference signal. Computing group hopping of demodulation reference signal which is a reference signal for the demodulation of PD2DSCH or PUSCH may be refer to as computing DM-RS base sequence.

$$c_{init} = \left\lfloor \frac{n_{ID}^{RS}}{30} \right\rfloor \quad \text{[Equation 12]}$$

Referring to FIG. 5, based on an initial value $c_{init}$ computed in accordance with various exemplary embodiments, a UE generates pseudo-random sequence (S505).

Pseudo-random sequence c(i) may be defined by length-31 Gold sequence. c(i) is a binary pseudo-random sequence and may have the value of 0 or 1. Output sequence c(n) having length $M_{PN}$ (n=0, 1, . . . , $M_{PN-1}$) can be defined as shown in equation 13.

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{[Equation 13]}$$

In equation 13 $N_C$=1600, and a first m-sequence $x_1(i)$ can be initialized as $x_1(0)$=1, $x_1(n)$=0, (n=1, 2, . . . , 30). As described above, the initialization of a second m-sequence $x_2(i)$ may result to different values, based on system parameters used in a channel or signal to which a pseudo-random sequence is applied as shown in equations 1, 3, 5, 7, 9 and 11.

A UE performs, based on a pseudo-random sequence, baseband processing in a subframe (S510). Here, baseband processing may include, for example, scrambling on a codeword of a D2D communication channel, frequency hopping for resource blocks assigned for D2D communication channel transmission, and group hopping of demodulation reference signal which is a reference signal for demodulating D2D communication channel.

As such, by defining an initial value of a pseudo-random sequence adapted to a D2D communication and start points of computing the initial value, a transmitting UE may effectively configure a pseudo-random sequence for scrambling, frequency hopping, and/or group hopping depending on D2D resource configuration.

Figure 6:
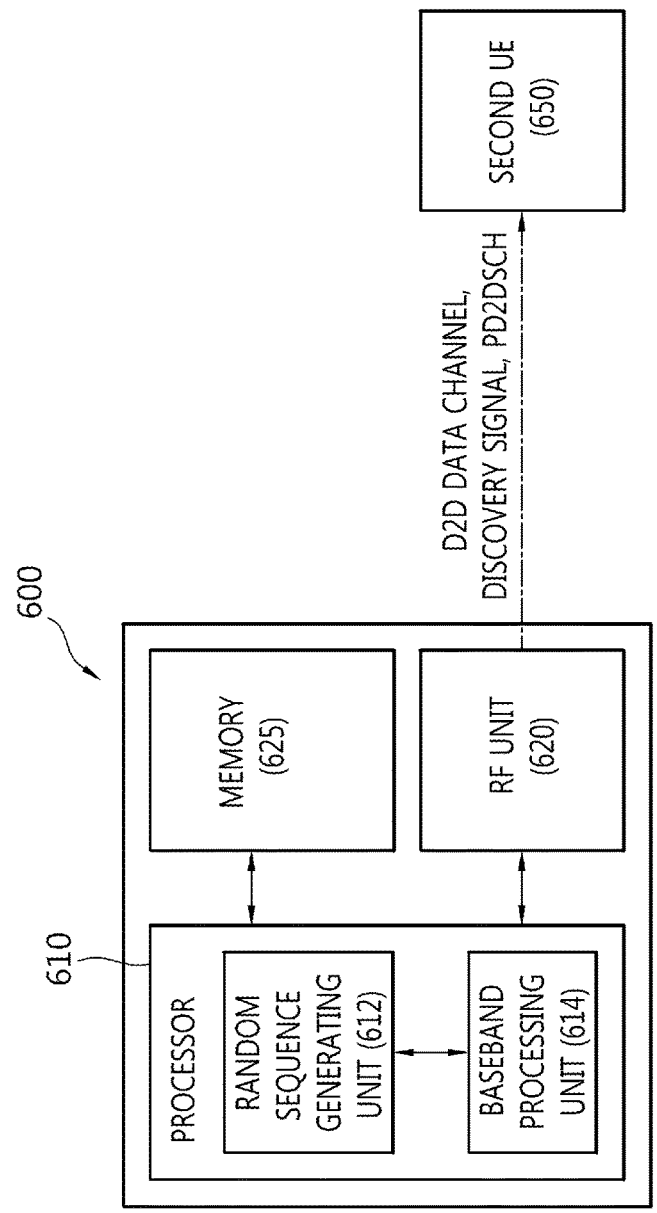
FIG. 6 is a diagram illustrating an example of a UE to transmit a D2D communication signal through a D2D communication channel, according to one or more exemplary embodiments.

FIG. 6 is a diagram illustrating an example of a UE to transmit a D2D communication signal through a D2D communication channel, according to one or more exemplary embodiments.

Referring to FIG. 6, a first UE 600, which is a transmitting or source UE, transmits to a second UE 650 D2D data channel, discovery signal, PD2DSCH, etc., and the second UE 650, which is a receiving UE, receives from the first UE D2D data channel, discovery signal, PD2DSCH, etc. The roles of the first UE 600 and the second UE 650 can be exchanged. For example, the first UE 600 can be a receiving UE, and the second UE 650 can be a transmitting UE or a source UE. Though the detailed components and functions of the first UE 600 will be described hereinafter, the same components and/or functions may be applied to the second UE 650.

The first UE 600 includes a processor 610, a radio frequency (RF) unit 620, and a memory 625.

The memory 625 connected to the processor 610, stores various information for operating the processor 610. The RF unit 620 in connection with the processor 610, transmits and/or receives a wireless signal. For example, the RF unit 620 may transmit to the second UE 650 PD2DSS, SD2DSS, D2D data channel, discovery signal, PD2DSCH, or receive from the second UE 650 PD2DSS, SD2DSS, D2D data channel, discovery signal, and PD2DSCH.

Further, the processor 610 may include a random sequence processing unit 612 and a baseband processing unit 614.

Specifically, the random sequence processing unit 612 computes an initial value $c_{init}$ to be used for generating pseudo-random sequence c(i), at a determined start point, such as the start of each D2D subframe (the first start points), each D2D slot (or at the beginning (or start) of each D2D slot) fulfilling $n_{s\_D2D}=0$ (the second start points), and the start of each D2DSS subframe (the third start points), etc.

Here, a random sequence processing unit 612 may compute an initial value $c_{init}$ based on equation and start defined by the types of a D2D communication channel and a baseband processing in which a corresponding pseudo-random sequence is utilized.

In one or more exemplary embodiments, when the first UE 600 attempts to transmit D2D data via PSSCH which is a D2D communication channel, and the baseband processing unit 614 carries out scrambling on a codeword on the PSSCH, the random sequence processing unit 612 computes an initial value $c_{init}$ at the first start points and utilizes the following equation.

$$c_{init}=(SAID)\cdot 2^{14}+\lfloor n_{s\_D2D}/2 \rfloor \cdot 2^9+510 \quad \text{[Equation 14]}$$

More specifically, for a physical sidelink processing, the random sequence processing unit 612 sets 510 instead of a cell ID used for scrambling, sets an identifier SA ID included in scheduling assignment instead of RNTI value $n_{RNTI}$ used for the scrambling, and computes an initial value by setting the index of the codeword to 0. The baseband processing unit 614 carries out scrambling of a codeword on the PSSCH based on the initial value.

In one or more exemplary embodiments, in case where the first UE 600 attempts to transmit D2D data on PSSCH which is a D2D communication channel and the baseband processing unit 614 carries out frequency hopping on a resource block assigned for the transmission of PSSCH, the random sequence processing unit 612 computes an initial $c_{init}$ value at the second start points, and utilizes the following equation.

$$c_{init}=510 \quad \text{[Equation 15]}$$

More specifically, the random sequence processing unit 612 sets a value of 510 as an initial value. Then, the baseband processing unit 614 performs frequency hopping on a resource block assigned for the transmission of PSSCH based on the initial value.

In one or more exemplary embodiments, in case where the first UE 600 attempts to transmit D2D data on PSSCH which is a D2D communication channel and the baseband processing unit 614 carries out group hopping of a demodulation reference signal which is a reference signal for demodulating the PSSCH, the random sequence processing unit 612 computes an initial $c_{init}$ value at the second start points, and utilizes the following equation.

$$c_{init}=\left\lfloor \frac{(SAID)}{30} \right\rfloor \quad \text{[Equation 16]}$$

More specifically, the random sequence processing unit 612 computes an initial value by setting an identifier SA ID included in scheduling assignment instead of a reference signal identifier used for group hopping. Then, the baseband processing unit 614 performs group hopping of demodulation reference signal which is a reference signal for demodulating the PSSCH based on the initial value.

In one or more exemplary embodiments, in case where the first UE 600 attempts to transmit PD2DSCH, and the baseband processing unit 614 carries out scrambling of a codeword on the PD2DSCH, the random sequence processing unit 612 computes an initial value $c_{init}$ at the third start points, and utilizes the following equation.

$$c_{init}=(PSSID) \quad \text{[Equation 17]}$$

More specifically, the random sequence processing unit 612 sets PSSID as an initial value, and carries out scrambling of a codeword on PD2DSCH based on the initial value.

In one or more exemplary embodiments, when the first UE 600 attempts to transmit PD2DSCH, and the baseband processing unit 614 carries out frequency hopping on a resource block assigned for transmitting the PD2DSCH, the random sequence processing unit 612 computes an initial value $c_{init}$ at the third start points, and utilizes the following equation.

$$c_{init}=(PSSID) \quad \text{[Equation 18]}$$

More specifically, the random sequence processing unit 612 sets PSSID as an initial value, and the baseband processing unit 614 carries out frequency hopping on a resource block assigned for the transmission of PD2DSCH based on the initial value.

In one or more exemplary embodiments, when the first UE 600 attempts to transmit PD2DSCH, and the baseband processing unit 614 carries out group hopping of a demodulation reference signal which is a reference signal for demodulating the PD2DSCH, the random sequence processing unit 612 computes an initial value $c_{init}$ at the third start points, and utilizes the following equation.

$$c_{init}=\left\lfloor \frac{(PSSID)}{30} \right\rfloor \quad \text{[Equation 19]}$$

More specifically, the random sequence processing unit 612 sets SA ID that is an identifier included in scheduling assignment, instead of a reference signal identifier used for group hopping, to compute an initial value, and the baseband processing unit 614 carries out group hopping of a demodulation reference signal which is a reference signal for demodulating PD2DSCH based on the initial value.

Further, according to one or more exemplary embodiments, a processor of a UE may process an initialization for a D2D communication between user equipments (UEs). The processor may determine D2D subframes available for a D2D communication. The D2D subframes may be D2D data subframes allocated to transmit D2D data and used for D2D data transmission by mapping D2D data channels therein. The D2D data subframes are included in a D2D resource pool, and a D2D resource pool may include resources for transceiving control information for a D2D communication and resources for transceiving data for a D2D communication. The D2D subframes includes a first D2D subframe and a second D2D subframe. Each of the first D2D subframe and the second D2D subframe including a D2D slot corresponding to D2D slot number 0. At the start of the D2D slot of the first D2D subframe and at the start of the D2D slot of the second D2D subframe, the processor may process an initialization associated with a pseudo-random sequence of a D2D communication. Each of the first D2D subframe and the second D2D subframe further includes a D2D slot corresponding to D2D slot number 1, and at least one of the first D2D subframe and the second D2D subframe corresponds to a non-zero subframe number of a radio frame. For example, as shown at the bottom of FIG. 3, the third subframe in frame 0 has subframe number 2, but has D2D slot number 0 and D2D subframe number 0. The eighth subframe in frame N has subframe number 7, but has D2D slot number 0 and D2D subframe number 0. A radio frequency signal transmitter may transceive a D2D signal associated with the pseudo-random sequence.

Further, D2D slots in a D2D resource pool may be indexed in an ascending order from 0 such that the first D2D slot in the D2D resource pool has D2D slot number 0. By applying modulo-20 operations for each D2D slot, D2D slot numbers are determined to have one of 0, 1, 2, ..., 18, and 19. An initialization of a pseudo random sequence may be performed at the start of each D2D slot fulfilling $n_{s\_D2D}=0$ (or e.g., at the beginning of every D2D slot fulfilling $n_{ss}$ mod 20=0 or $n_{ssf}$ mod 10=0). Here, the pseudo random sequence may be associated with the frequency hopping or the group hopping described herein. When the D2D subframe corresponds to the PSSCH subframe used for transmitting a PSSCH (and/or the D2D slot corresponds to a PSSCH slot used for transmitting a PSSCH, an initialization of a pseudo random sequence may be performed at the start of each D2D slot fulfilling $n_{ss}^{PSSCH}$ mod 20=0 or $n_{ssf}^{PSSCH}$ mod 10=0). Here, $n_{ss}^{PSSCH}$ corresponds to a slot index of a PSSCH slot and $n_{ssf}^{PSSCH}$ corresponds to a subframe index of a PSSCH subframe. More specifically, the D2D subframe may be the PSSCH subframe for configuring a D2D resource pool including PSSCH subframes and PSSCH subframes may be indexed in an ascending order and the PSSCH subframe number $n_{ssf}^{PSSCH}$ may be determined by the modulo-10 operation. Further, each PSSCH subframe may consist of two PSSCH slots, and the PSSCH slot number $n_{ss}^{PSSCH}$ may be determined from the PSSCH subframe number or by applying the modulo-20 operation to indexes of PSSCH slots. In such a configuration, subframes to be used to transmit PSSCH may be determined as D2D subframes and may be indexed and numbered.

According to one or more exemplary embodiments, each of the D2D subframes consists of two D2D slots having consecutive D2D slot numbers. The D2D subframes are included in a resource pool defined in the at least two radio frames. The at least two radio frames include a first radio frame and a second radio frame. Each of the first radio frame and the second radio frame consists of ten subframes, and the first D2D subframe may correspond to a subframe of the first radio frame having a non-zero subframe number. The second D2D subframe may correspond to a subframe of the second radio frame having a non-zero subframe number.

The processing the initialization may include initializing at least one of a first initialization value associated with a frequency hopping for a transmission of a physical sidelink shared channel (PSSCH) and a second initialization value associated with a group hopping for a demodulation reference signal (DM-RS) to demodulate a PSSCH. The processing the initialization may include initializing a pseudo random sequence generation associated with the frequency hopping with the first initialization value, and initializing a pseudo random sequence generation associated with the group hopping with the second initialization value. The processor may include a random sequence generating unit to generate a pseudo random sequence associated with the frequency hopping with the first initialization value, and to generate a pseudo random sequence associated with the group hopping with the second initialization value.

According to one or more exemplary embodiments, at a start of each D2D subframe, an initialization value associated with a scrambling of a codeword associated with a transmission of a physical sidelink shared channel (PSSCH) may be initialized. Further, at the start of each D2D subframe, a scrambling sequence generation with Cinit may be initialized, where $C_{init}=(SA\ ID)\cdot 2^{14}+n_{sf\_D2D}\cdot 2^9+510$, SA ID corresponds to an identity associated with a scheduling assignment, $n_{sf\_D2D}$ corresponds to a D2D subframe number of the respective D2D subframe.

Further, when a frequency hopping for a transmission of a physical sidelink shared channel (PSSCH) is enabled, an initialization value associated with the frequency hopping may be computed at a start of each D2D slot corresponding to the D2D slot number 0, and the initialization value includes a value of 510.

Further, when a group hopping for a demodulation reference signal (DM-RS) associated with a transmission of a physical sidelink shared channel (PSSCH) is enabled, an initialization value associated with the group hopping may be computed at a start of each D2D slot corresponding to D2D slot number 0, and the initialization value corresponds to $$c_{init} = \left\lfloor \frac{SAID}{30} \right\rfloor,$$

where SA ID corresponds to an identity associated with a scheduling assignment.

As shown in FIG. 13, D2D slots corresponding to D2D slot numbers 2 to 19 exist between the first D2D subframe and the second D2D subframe in an ascending order.

According to one or more exemplary embodiments, a UE may perform: indexing at least one of a D2D slot and a D2D subframe available for a D2D communication, the D2D subframe being included in a radio frame and comprising the D2D slot, the radio frame comprising at least one non-D2D subframe unavailable for a D2D communication; determining at least one of a D2D slot number associated with the D2D slot and a D2D subframe number associated with the D2D subframe, based on a modulo operation; and determining an initialization associated with a pseudo-random sequence of a D2D communication, the initialization being associated with the D2D slot or the D2D subframe. The at least one of the D2D slot and the D2D subframe has a non-zero index, and the at least one of the D2D slot number associated with the D2D slot and the D2D subframe number associated with the D2D subframe is zero.

As shown in FIG. 3, the radio frame has a system frame number (SFN) associated with an evolved NodeB (eNodeB) or a D2D frame number (DFN) associated with a cluster head UE. The D2D subframe may be associated with a Physical Sidelink Shared Channel (PSSCH) through which data of a D2D communication is transmitted between UEs.

With regard to the indexing and a modulo operation, the UE may perform determining a D2D resource pool comprising the D2D subframes, and indexing the D2D subframes of the D2D resource pool in an ascending order. D2D subframe numbers for the indexed D2D subframes are determined, based on a modulo-10 operation, and the initialization associated with a pseudo-random sequence of a D2D communication is performed at a start of each slot corresponding to D2D slot number 0 or at a start of each subframe corresponding to D2D subframe number 0.

A D2D resource pool including the D2D subframes available for transmitting data of the D2D communication may be determined in advance. For Time Division Duplex (TDD) system, uplink subframes in the radio frame may correspond to D2D subframes. According to the TDD system, uplink subframes in a radio frame may be determined based on TDD UL-DL configurations. Details of the TDD UL-DL configurations are defined in 3GPP standards specification, such as "3rd Generation Partnership Project; Technical Specification Group Radio Access Network; Evolved Universal Terrestrial Radio Access (E-UTRA); Physical channels and modulation (Release 12)", 3GPP TS36.211 V12.3.0 (September 2014). Details of TDD UL-DL configurations defined in 3GPP TS36.211 V 12.3.0 are hereby incorporated by reference, but exemplary embodiments are not limited thereto. In FDD system, a radio frame (having SFN or DFN) includes ten uplink subframes, and thus the ten uplink subframes in the radio frame may be D2D subframes of a D2D resource pool.

With regard to initialization periods, an initialization value Cinit used for generating the pseudo random sequence c(i) may be obtained at a start of each D2D slot corresponding to D2D slot number 0. The initialization value Cinit may correspond to an initial value used for a D2D demodulation reference signal (DM-RS), and the D2D DM-RS may be used for demodulating a Physical Sidelink Shared Channel (PSSCH) for a D2D data communication.

Further, according to one or more exemplary embodiments, a method of a UE to perform a D2D data communication with another UE in a wireless communication system includes: confirming D2D subframes for a data transmission of a D2D communication, the D2D subframes being D2D data subframes for transceiving D2D data and being included in a D2D resource pool; allocating indexes to D2D slots in the D2D resource pool; allocating D2D slot numbers to the D2D slots by applying a modulo operation to the indexes; and initializing a pseudo random sequence for a D2D communication at each slot with D2D slot number=0. Each D2D subframe may consist of two D2D slots. Further, the D2D resource pool may be defined within at least 4 radio frames, and each radio frame may consist of 10 subframes. The applied modulo operation may be modulo-20 operation. The D2D subframes may be PSSCH subframes in which PSSCH is mapped to transmit or receive data for a D2D data communication.

The initializing of the pseudo random sequence for a D2D communication may include computing an initial value Cinit for generating pseudo random sequence c(i) at each D2D slot fulfilling $n_{ss}^{PSSCH}$ mod 20=0 (or at each D2D subframe fulfilling $n_{ssf}^{PSSCH}$ mod 10=0) in association with a DM-RS. The initializing of the pseudo random sequence for a D2D communication may include, at each D2D slot fulfilling $n_{ss}^{PSSCH}$ mod 20=0, computing an initial value $$c_{init} = \left\lfloor \frac{SAID}{30} \right\rfloor$$

associated with a demodulation reference signal (DM-RS) for demodulating a PSSCH in which D2D data is mapped and initializing a pseudo random sequence.

The initializing of the pseudo random sequence for a D2D communication may include computing an initial value Cinit for generating pseudo random sequence at each D2D slot fulfilling $n_{ss}^{PSSCH}$ mod 20=0 (or at each D2D subframe fulfilling $n_{ssf}^{PSSCH}$ mod 10=0) in association with a frequency hopping. The initial value may be 510 and may be used in association with a frequency hopping for allocated resource blocks for transmitting PSSCH.

A scrambling sequence for a D2D communication may be initialized periodically and an initial value Cinit associated with the scrambling sequence may be computed at each PSSCH subframe. The initial value Cinit may be $C_{init}$=(SA ID)$\cdot 2^{14}$+$n_{sf\_D2D} \cdot 2^9$+510 and may be used for a scrambling of a codeword, which is transmitted through a PSSCH.

The above description is to explain exemplary embodiments of inventive concept, and it will be apparent to those skills in the art that modifications and variations can be made without departing from the spirit and scope of inventive concept. Thus, it is intended that the present invention cover the modifications and variations of exemplary embodiments provided they come within the scope of the appended claims and their equivalents.

What is claimed is:

1. A method of performing a device-to-device (D2D) communication between user equipments (UEs), the method comprising:
   discovering between the UEs with a discovery signal transmitted in Physical Sidelink Discovery Channel (PSDCH);
   synchronizing between the UEs with a synchronization signal including a primary synchronizing signal and a secondary synchronizing signal;
   determining D2D frames available for a D2D communication from an available D2D resource pool;
   initializing a pseudo-random sequence for the D2D communication with an initialization value associated with at least one of a group hopping for a demodulation reference signal (DM-RS) or a frequency hopping on a physical sidelink shared channel (PSSCH) at a reference D2D slot in each of the D2D frames, wherein a number of the reference D2D slot is 0,
   wherein one or more of slots in the D2D frames have different number with slots in system frames (SFs),
   wherein the primary synchronizing signal is transmitted in two Single Carrier-FDMA (SC-FDMA) symbols and the secondary synchronizing signal is transmitted in another two SC-FDMA symbols,
   wherein the two SC-FDMA symbols are transmitted in a same D2D subframe and the another two SC-FDMA symbols are transmitted in a same D2D subframe, wherein each of the D2D frames consists of 10 D2D subframes, and wherein each of the D2D subframes consists of two D2D slots; and at a start of each of the D2D subframes, initializing an initialization value associated with a scrambling of a codeword associated with a transmission of a PSSCH.

2. The method of claim 1, wherein the initializing comprises:

initializing a pseudo random sequence generation associated with the frequency hopping with the frequency hopping initialization value; and initializing a pseudo random sequence generation associated with the group hopping with the group hopping initialization value.

3. The method of claim 1, further comprising:

at the start of each of the D2D subframes, initializing a scrambling sequence generation with Cinit, where $C_{init}=(SA\ ID)\cdot 2^{14}\pm n_{sf\_D2D}\cdot 2^9+510$, SA ID corresponds to an identity associated with a scheduling assignment, $n_{sf\_D2D}$ corresponds to a number of D2D subframe.

4. The method of claim 1, wherein the group hopping initialization value corresponds to $$c_{init} = \left\lfloor \frac{SAID}{30} \right\rfloor,$$

where SA ID corresponds to an identity associated with a scheduling assignment.

5. A user equipment (UE) to perform a device-to-device (D2D) communication with another UE, the UE comprising:

a processor configured to:

discover the another UE with a discovery signal transmitted in Physical Sidelink Discovery Channel (PSDCH);

synchronize with the another UE with a synchronization signal including a primary synchronizing signal and a secondary synchronizing signal;

determine D2D frames available for a D2D communication from an available D2D resource pool;

initialize a pseudo-random sequence for the D2D communication with an initialization value associated with at least one of a group hopping for a demodulation reference signal (DM-RS) or a frequency hopping on a physical sidelink shared channel (PSSCH) at a reference D2D slot in each of the D2D frames, wherein a number of the reference D2D slot is 0; and initialize an initialization value associated with a scrambling of a codeword associated with a transmission of a PSSCH at a start of each of D2D subframes; and a radio frequency signal transmitter to transceive a D2D signal associated with the pseudo-random sequence, wherein the D2D frames are frames in which a PSSCH is transmitted or received, wherein one or more of slots in the D2D frames have different number with slots in system frames (SFs), wherein the primary synchronizing signal is transmitted in two Single Carrier-FDMA (SC-FDMA) symbols and the secondary synchronizing signal is transmitted in another two SC-FDMA symbols, wherein the two SC-FDMA symbols are transmitted in a same D2D subframe and the another two SC-FDMA symbols are transmitted in a same D2D subframe, wherein each of the D2D frames consists of 10 D2D subframes, and wherein each of the D2D subframes consists of two D2D slots.

6. The UE of claim 5, wherein the group hopping initialization value corresponds to $$c_{init} = \left\lfloor \frac{SAID}{30} \right\rfloor,$$

where SA ID corresponds to an identity associated with a scheduling assignment.

* * * * *